(No Model.)
G. B. FRENCH.
MACHINE FOR SOFTENING AND BENDING THE HORNS OF CATTLE.
No. 383,519. Patented May 29, 1888.
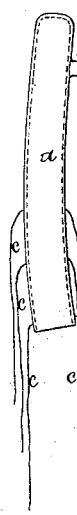
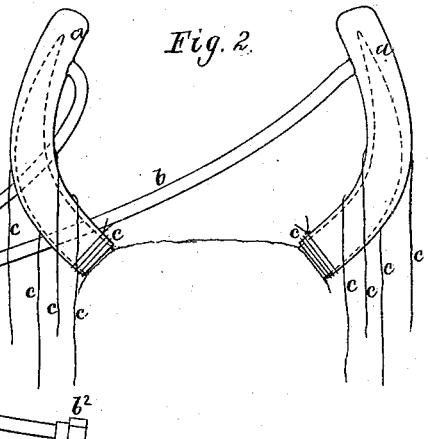
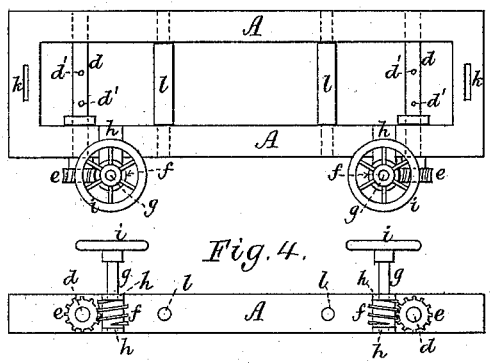
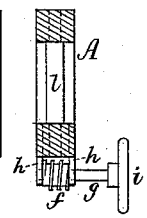
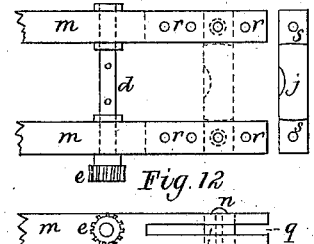
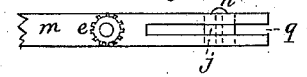
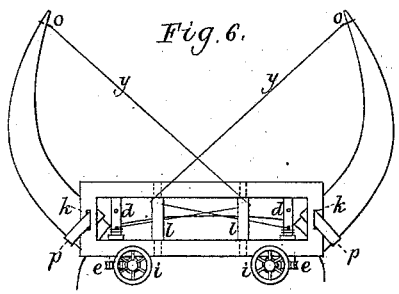
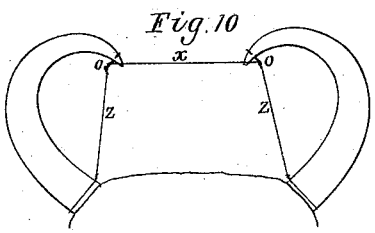
Witnesses.
A. F. Piper.
W. E. Piper.
Inventor.
George B. French.
by Singleton & Piper attys.

UNITED STATES PATENT OFFICE.

GEORGE BLOOD FRENCH, OF FREMONT, NEBRASKA.

MACHINE FOR SOFTENING AND BENDING THE HORNS OF CATTLE.

SPECIFICATION forming part of Letters Patent No. 383,519, dated May 29, 1888.

Application filed December 9, 1887. Serial No. 257,388. (No model.)

*To all whom it may concern:*

Be it known that I, GEORGE BLOOD FRENCH, a citizen of the United States, residing at Fremont, in the county of Dodge and State of Nebraska, have invented certain new and useful Improvements in Machines for Softening and Bending the Horns of Cattle and afterward securing them in position so that their ends will grow inward and downward; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention answers as a substitute for the practice of "dehorning" cattle; and it consists in devices by which the substance of the horns of an animal is softened by the application thereto of chemical agencies or by the use of steam, or both, thus making the horns sufficiently flexile to be bent without injury to them by gradually turning the ends of the horns inward and downward by means of a mechanism to be hereinafter described, whereby the tips of the horns are made to grow inward and downward instead of upward and outward, as the horns of many breeds naturally grow, and thus renders the animal practically incapable of doing injury to others in the herd.

The nature of my invention is defined in the claims hereinafter presented.

In the drawings, Figure 1 is a representation of the horn-sack and its appendages, to be hereinafter described. Fig. 2 shows the horn-sack as applied to the horns of an animal during the operation of steaming them. Fig. 3 is a front view, Fig. 4 a bottom edge view, and Fig. 5 a transverse and vertical section, of a mechanism for bending the tips of the horns after they have been softened and rendered temporarily flexile, as hereinafter described. Fig. 6 is a view showing the manner of applying to an animal the mechanism for bending the horns. Figs. 7, 8, and 9 are views of the clasp which is to be applied to the tips of the horns, Fig. 7 showing it in top view and Fig. 8 in side view as it appears before it is inserted into the hole made to receive it in the tip of the horn, and Fig. 9 in top view as it appears after it has been inserted in said hole and bent around the horn in opposite directions. Fig. 10 is a view of the horns of an animal after they have been curved by the bending mechanism and secured in the position in which they are to grow. Figs. 11, 12, and 13 illustrate modifications in the frame of the bending mechanism, Fig. 11 being a front view, Fig. 12 an edge view of it, and Fig. 13 an edge view as applied to the horns.

The horn-sack (represented at $a$ in Fig. 1) is a long tubular bag or sack made of rubber, leather, oiled cloth, or other suitable material, open at one end and closed at the other. At or near its closed end it is provided or connected with a tube, $b$, which has a proper coupling at its free end for connecting it with a nozzle provided with a valve or cock and projecting from a steam-generator. At or near its open end the horn-sack is provided with a pair of cords, $c$ $c$, for closing and securing it to the base of the horn, and between said cords and the closed end of the sack are several pairs of cords, $c$ $c$, arranged as shown in the drawings.

In Figs. 3, 4, and 5 of the drawings, A denotes a rectangular frame, made of wood or metal, as may be desired. Extending through the top and bottom of the frame A are two shafts, $d$ $d$, which are so arranged in said frame that they can revolve therein, and are each provided on its lower end with a worm-gear, $e$, which engages with a worm, $f$, whose shaft $g$ is sustained in bearings $h$ $h$, secured to the under side of the frame, as shown. Each worm-shaft is provided with a hand-wheel, $i$. In the ends of the frame are slots $k$, which are to receive straps to confine the frame to the base of each horn, as represented in Fig. 6.

Between the two shafts $d$ $d$ are two shafts or rollers, $l$ $l$, which are so applied to the frame that they can freely revolve therein, the object of the said rollers $l$ being to bring the point of resistance, when power is applied to the wires $y$ by the hand-wheels $i$, as nearly at right angles as may be to the general direction of the tips of the horns, in order to facilitate the bending of them, and also to assist in holding the power applied to the said wires $y$. The shafts $d$ $d$ are provided with holes $d'$ $d'$, which extend through them, as shown.

The clasp o, to be inserted in a hole made in or near the tip of the horns, is shown in Figs. 7, 8, and 9, it being provided with an eye and two long shanks, as shown.

The animal to be operated upon is firmly secured in a stall or by a halter, or in such manner as to be readily controlled. A hole is then bored through each horn near the tip or point thereof. Said holes are next closed or filled with wax or putty. Next the ends of the horns from the tip to a short or proper distance below the holes are covered with a coating of glue and cement or a preparation of gum-arabic and lime, or some other glutinous substance that will quickly harden after being applied and be practically impervious to the action of steam. This is done to preserve the hardness of the tip of the horn through which the hole has been bored, so that after the horn has been submitted to the softening process and the clasp shown in Fig. 7 inserted in said hole and the ends of it bent around the horn, as shown in Fig. 9, and power applied to the clasp to bend the horn, the clasp will not tear or break out of said hole, as it would be liable to do had the tip of the horn been softened during the process of steaming it. The hole in the tip of the horns to receive the clasp o can be made therein after the horn has been steamed, if preferred, and thus do away with the necessity of filling said hole with wax or putty. All excrescences on the horns are next to be removed by scraping or otherwise, and they are to be washed with a preparation of oil of turpentine, olive-oil, glycerine, common soap, or extract of lye and rain-water, or some similar preparation which will cleanse them and tend to open the pores and make them more susceptible to the action of steam. One of the sacks a is next applied to each horn so as to envelop it, and the mouth of the sack is closed around the base of the horn and secured thereto by the lower pair of cords c. The free end of the pipe b of each sack a is then to be coupled with a nozzle projecting from a steam-generator, and steam is next admitted to the sacks. The thickness of the horns increases from the base toward the tip, and during the operation of steaming them, as the tip will need to be steamed more than the base, it will be necessary to shut off the steam from the base or thin part of the horn by winding and tying the pairs of cords c around the sacks successively from the base toward the tip, as may be required, so that the upper part of the horns may be steamed for a longer period of time, or sufficiently to make them flexile. When this has been accomplished, the steam is shut off, the sacks a taken from the horns, the wax or putty removed from the holes in the tips of the horns, the clasps o inserted in the said holes and bent around the horns, as shown in Fig. 9, and the frame A fastened to the base of each horn by straps p, as shown in Fig. 6. A wire, y, is next to be secured to each clasp o and carried under or around the rollers l, it being first passed under or around the roller l which is located the farthest from the base of the horn from whose tip the said wire y is led, and then to and through one of the holes d' in the shaft d which is nearest the base of said horn, and is secured to said shaft d. The attendant can now, by revolving the hand-wheels i, cause the wires y to be wound around the shafts d and the tips of the horns to be drawn or curved inward and downward, as shown in Fig. 10. When the tips of the horns have been brought into the required position, a wire, x, should be secured to each clasp o to keep the tips from spreading, and a wire, z, fastened to each of the clasps o and the base of each horn, as shown in said Fig. 10. This having been done, the hand-wheels i should be turned so as to slacken the tension on the wires y, which can now be disengaged from the clasps o, the straps p unbuckled and disconnected from the horns, and the frame A removed from the head of the animal.

Thus it will be seen that by my invention horned animals, however vicious they may be, can be rendered practically inoffensive and incapable of doing injury by means of the horns to their attendants or to the other animals associated with them, and can be made to herd with horses, goats, sheep, swine, &c., and this can be accomplished without disfiguring or maiming them or impairing their usefulness or beauty, and without causing them pain and suffering, and is far preferable to the practice of dehorning them, which is getting to be quite prevalent in cattle-growing regions.

Sometimes I form one or both ends of the side or longitudinal bars, m, of the frame with long slots q and with series of holes r, as shown in Fig. 11, and the end bars, j, of the frame I also form with a tenon on each end to enter said slots q. Said tenons also have holes s to correspond with the holes r in the side bars, and are to receive bolts or pins n, which pass through the holes r into the holes s and confine the said end bars to the side bars. This construction of the frame is to admit of its adjustment and application to the horns of different animals, however much they may vary in width, and so that the horns can be received inside of and between the ends of the frame in manner as shown in Fig. 13, it being secured to the horns by straps p, which pass through slots or eyes in the ends of the frame and buckle around the base of the horns, as represented. The ends of the frame, resting against the outer surface of the base of the horns, operate to resist the tendency of the frame to rise when tension is applied to the wires y by the hand-wheels i and the mechanism connected therewith during the operation of bending the horns.

Having described my invention, what I claim is—

1. The horn-sack a, having the series of cords c and the pipe b connected therewith, said pipe having its free end provided with a coupling, $b^2$, for connecting it with a nozzle projecting from a steam-generator, substantially as shown and described.

2. The horn-bending mechanism, substantially as described, it consisting of the frame A, provided at its ends with slots $k$ and having bearings for properly sustaining therein the shafts $d\ d$ and $l\ l$, each shaft $d$ being provided with holes $d'$ and having secured to its lower end a worm-gear, $e$, which operates with a worm, $f$, secured to or forming a part of a shaft, $g$, supported in bearings $h\ h$, fastened to the frame A, each shaft $g$ having a hand-wheel, $i$, by revolving which motion can be communicated to the shafts $d$ through the gears $e$ and worms $f$, and shafts $g$, all as shown and set forth.

3. The frame A, having its side bars, $m$, provided with slots $q$ and series of holes $r$, and its end bars, $j$, formed with tenons on the ends to enter the slots $q$, and having holes $s$ to correspond with the holes $r$ to receive bolts or pins $n$, in combination with the shafts $d\ d$ and $l\ l$, worm-gears $e\ e$, worms $f f$, and shafts $g\ g$, sustained in bearings secured to the frame and provided with hand-wheels $i\ i$, all substantially as described and represented.

In testimony whereof I affix my signature in presence of two witnesses.

GEORGE BLOOD FRENCH.

Witnesses:
J. W. GOFF,
J. F. HANSON.